Figure 1:
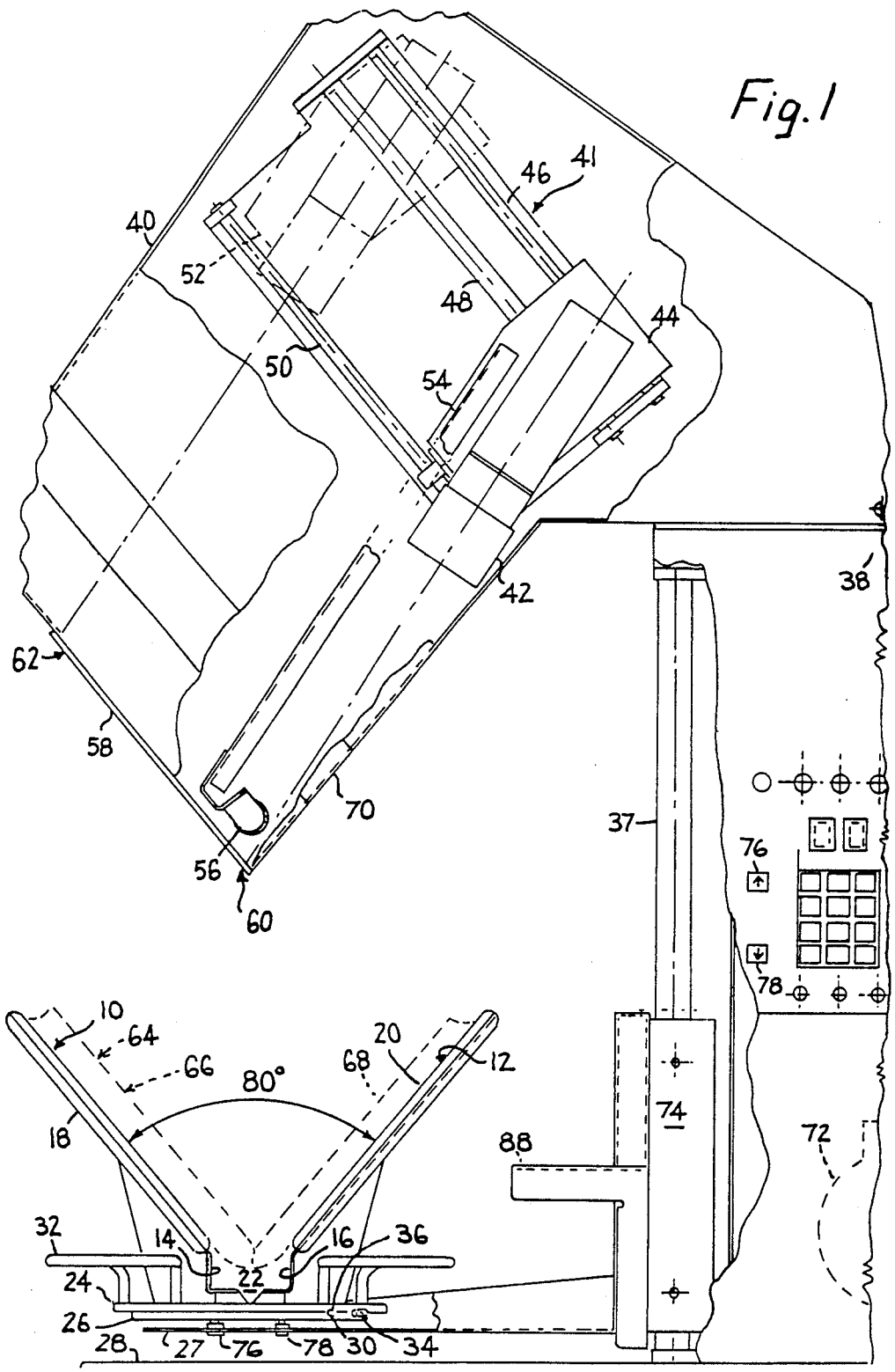

United States Patent [19]

Wilman et al.

[11] Patent Number: 4,633,080

[45] Date of Patent: Dec. 30, 1986

[54] DOCUMENT SCANNER HAVING AN IMPROVED BOOK SUPPORT ASSEMBLY

[76] Inventors: Hugh Wilman, 76 Mount Grace Road, Potters Bar, Hestfordshire; James Brotton, 1 Moss Drive, Haslingfield, Cambridgeshire, both of England

[21] Appl. No.: 549,252

[22] Filed: Nov. 4, 1983

[30] Foreign Application Priority Data

Nov. 5, 1982 [GB] United Kingdom ............... 8231675

[51] Int. Cl.⁴ .................... G03B 27/00; H04N 1/036
[52] U.S. Cl. ................................. 250/234; 355/82; 358/293
[58] Field of Search .............. 250/234, 235, 578; 355/75, 82; 358/285, 293

[56] References Cited

U.S. PATENT DOCUMENTS 3,224,352 12/1965 Valette et al. ................ 355/82

Primary Examiner—Edward P. Westin
Attorney, Agent, or Firm—Gifford, Groh, VanOphem, Sheridan, Sprinkle & Dolgorukov

[57] ABSTRACT

A document scanner in which a book is supported by a trough shaped support which is movable up and down in order to place the book in contact with the scanner housing. The housing includes a wedge-shaped portion having at least one window through which a page of the book can be scanned. In addition to being movable into contact with the wedge-shaped housing the book support assembly is rotatable in order to scan the opposite page of the book and is fully adjustable to accommodate books of different sizes and thicknesses. The scanner housing is provided with a lamp to illuminate the page to be scanned and a scanning element which sequentially scans the book or document.

13 Claims, 4 Drawing Figures

DOCUMENT SCANNER HAVING AN IMPROVED BOOK SUPPORT ASSEMBLY

FIELD OF THE INVENTION

This invention concerns document scanners by which information carried by a surface can be converted into an electrical video signal which can be digitized for storage or may be used to control a television display or the like, to produce an image of the scanned surface in the display or may be employed as an input signal to a printer/plotter. The invention is particularly applicable to the scanning of folded documents and books.

BACKGROUND TO THE INVENTION

Conversion of information contained on a surface into an electrical signal can be achieved in number of ways.

In one arrangement relative movement is effected between a spot of light and an information bearing surface and reflected light from the spot is focussed onto a photocell. As the spot moves over the surface, the reflected light level varies in relation to the information content and a varying electrical signal derived from the photocell comprises the electrical video signal.

In another arrangement an electron beam is scanned over a photoconductive surface onto which an image of the surface is focussed. The electron beam current varies with the light level at different points of the photoconductive surface and an electrical signal derived from these current variations comprises the said electrical video signal.

In a further arrangement a narrow band of an illuminated information bearing surface is focussed onto a line of photoelectric elements, which are addressed in sequence and produce an electrical signal a parameter of which (such as amplitude) varies with the light level falling on the individual elements as the latter are scanned. By moving the lens and photoelectric elements relative to the illuminated surface, the latter is scanned in a series of parallel bands, each of which is effectively "scanned" by the sequential addressing of the elements.

Other arrangements are possible, it being understood that the foregoing are only exemplary of the large number of different types of device which can be used as a scanner.

Irrespective of the scanning method employed it is usually a prerequisite that the information bearing surface to be scanned is flat and conventionally a flat support is provided on which a document can be laid out flat and, where necessary, a transparent sheet such as a sheet of glass is laid over the document so as to maintain the latter flat. Alternatively the document may be laid face down on a window typically formed from a sheet of glass and if required a backing marker is laid over the document so as to maintain the latter flat in contact with the window.

Where the document to be copied is a book, the latter may be laid out flat with the page(s) to be copied flattened for example against a window through which the page(s) is/are to be viewed. However, it is found that the flattening of a book in this way can cause the binding of the book to be damaged. Where old and valuable books are to be scanned, opening the book out and flattening the page(s) to be scanned can easily damage the book and it is an object of the present invention to provide a document scanner for scanning the pages of a book without damaging the binding of the book.

One arrangement which has been proposed to overcome this problem comprises a wedge shaped support of transparent material such as glass over which the book is inverted. By employing a wedge angle of approximately 90° a book can be fitted over the wedge with minimal strain on the binding. However two problems have been discovered in practice, namely:

(1) the book is upside down during scanning and has to be lifted up and possibly turned over to enable another pair of pages to be selected. This results in excessive handling of the book which can provie almost as damaging as if the book is flattened and can produce operater fatigue.

(2) the book is suspended during scanning over the sharp apex of the wedge under its own weight and where the weight of the book is sufficient to keep the pages flat against the sides of the wedge, the weight can cause damage to the binding.

SUMMARY OF THE INVENTION

According to the present invention a document scanner for scanning a page of a book comprises:

(1) a housing having a wedge section at least one face of which comprises a window which can be positioned against the page of the book, with the ridge of the wedge in the fold of the book, (2) lamp means within the housing for illuminating the page positioned against the window, (3) a scanner movable within the housing to scan an illuminated page which is visible through said window to generate an electrical video signal corresponding to the information carried by the page, (4) a V-shaped trough in which the book will rest and forming a book support movably attached to the housing, the angle of the trough corresponding to the included angle of the wedge shaped housing and aligned therewith so that a book resting in the trough can be sandwiched between the faces of the wedge and the sides of the trough, and (5) drive means for effecting relative movement between the housing and the trough to permit movement sufficiently apart to enable insertion or removal of the back from the trough or page selection and, alternatively, for effecting relative movement of the housing and trough closely together to sandwich the book therebetween for scanning.

The lamp means is conveniently located within the housing along with the scanner, and the page is conveniently illuminated and scanned through the same window in the housing.

The trough is conveniently formed from two upwardly divergent plate means.

Conveniently a channel is provided between the two lowermost edges of the two plate means so as to accommodate the spine of a book resting in the trough formed by the two plate means.

In a preferred arrangement the two plate means are relatively movable so as to alter either the included angle therebetween or the lateral spacing between the two lowermost edges of the two plate means, or both, so as to allow the configuration of the trough to be varied to accommodate books of different thicknesses and bindings.

In addition or alternatively one or both of the plate means may be vertically mounted so as to allow the trough to follow precisely the configuration of any book laid therein, after the book has been entered by the wedge shaped housing. The surface of each plate may at least in part be formed from resiliently deformable material such as a foamed plastics material or the like, to accommodate any unevenness in the external surfaces of a book's covers such as may often occur with old, leather bound books and the like.

Preferably the drive means causes the trough to be lifted up and lowered down relative to the scanner housing.

Preferably the drive means is in two parts, one part being a powered drive for raising the trough up to a position at which it is a little below the wedge shaped housing and for lowering the trough in a downward direction from this position, and the other part being a manual drive by which the trough can, under the direct control of an operator, be moved upwardly (so as to squeeze the book below the wedge shaped housing), and moved downwardly from this position, to allow the book to be removed and/or the pages turned.

Preferably circuit means is provided for detecting when the book support has been moved into contact with a sensing device and means is provided to inhibit the powered drive means as soon as the book support comes into contact therewith.

The sensing device may be a micro switch or proximity switch and its vertical position may be adjustable relative to the underside of the wedge shaped scanner housing.

In a preferred arrangement the sensing means detects a preselected position of the document relative to the wedge shaped housing to inhibit or alter the operation of the powered drive means before the document makes contact with the housing.

Preferably the trough is movable sufficiently below the wedge shaped housing so as to allow the trough to be rotated about a central vertical axis, so that a book located therein can be rotated to present one opened page or the other to the window in the housing.

In a preferred embodiment an interlock is provided to inhibit rotation of the trough unless the latter is at or near its lowermost position.

Conveniently, means is included for changing the scanning of the scanner relative to the window in response to a rotation of the trough so that the scanning is always performed in a similar way relative to a page below the window.

In a preferred embodiment the scanner has a long narrow sensor and is mounted so that the length dimension of sensor is parallel to one edge of the window and scanning is achieved by moving the scanner within the housing so that the sensor is moved across the window, always parallel to the said one edge thereof, while continuous, sequential sampling of the light level at points along the length of the field of view is performed, so as to produce an electrical video signal.

Preferably, where the scanner is moved relative to the window, it is constrained so as always to be the same distance from the window, so as to maintain focus.

Preferably, means is provided for altering the focus of the focussing device (typically a lens) within the scanner and/or the depth of focus of the said focussing means.

Preferably, an elongate light source is employed as the said lamp means which is positioned parallel to the sensor of the scanner but just off axis so as not to be in the field of view of the scanner.

In a preferred embodiment the lamp means is carried on a frame which itself extends from and is ridigly attached to or forms part of a movable mounting carrying the scanner.

The scanner is conveniently electrically connected to circuit means for powering the scanner (as required) and converting an electrical signal otained from the scanner into an electrical video signal.

Preferably, lateral movement is permitted between the trough book support and its supporting platform in a direction perpendicular to the lowermost edge of the scanner housing which engages the book gutter to allow a book to center itself as it is offered up to the scanner housing.

Figure 2:
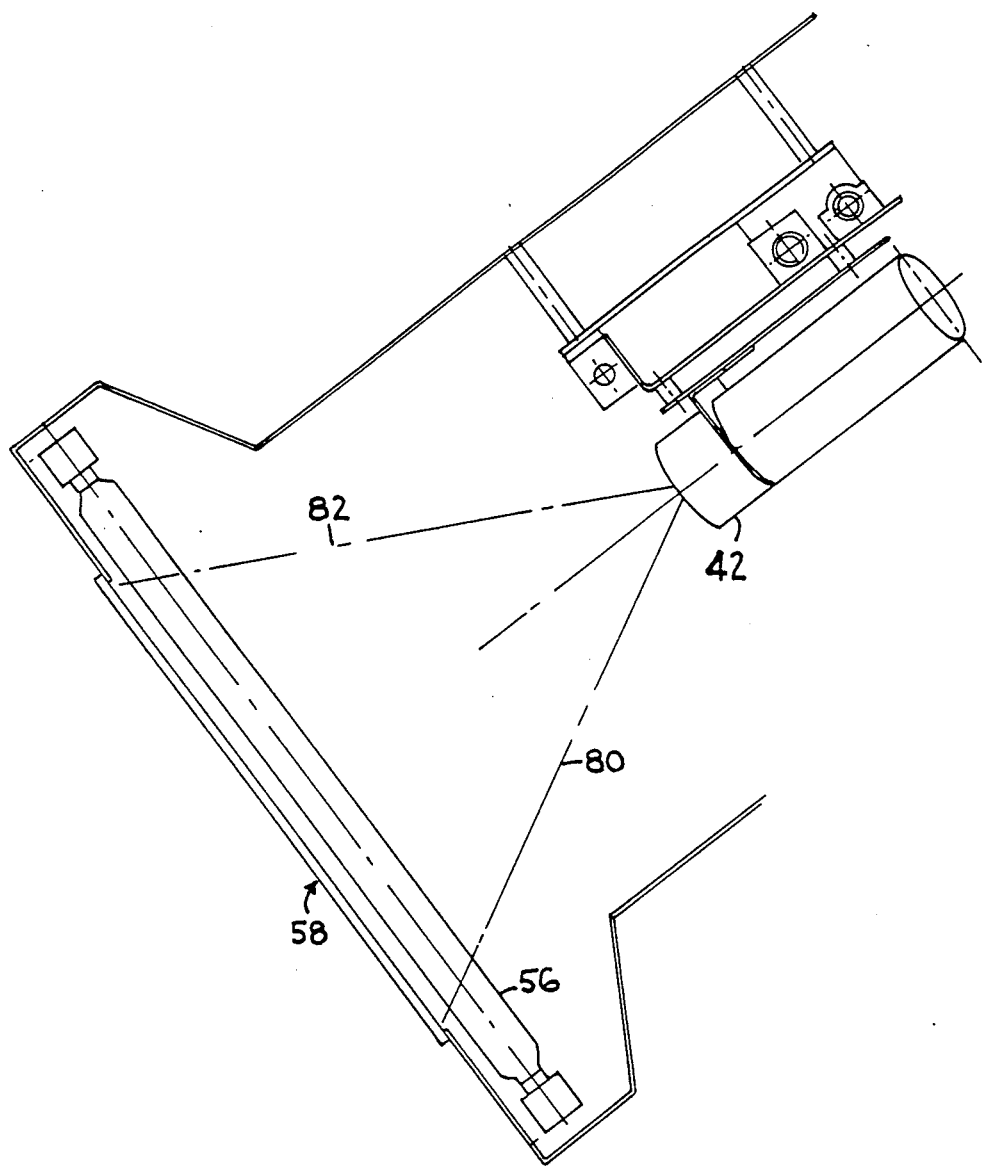
Figure 3:
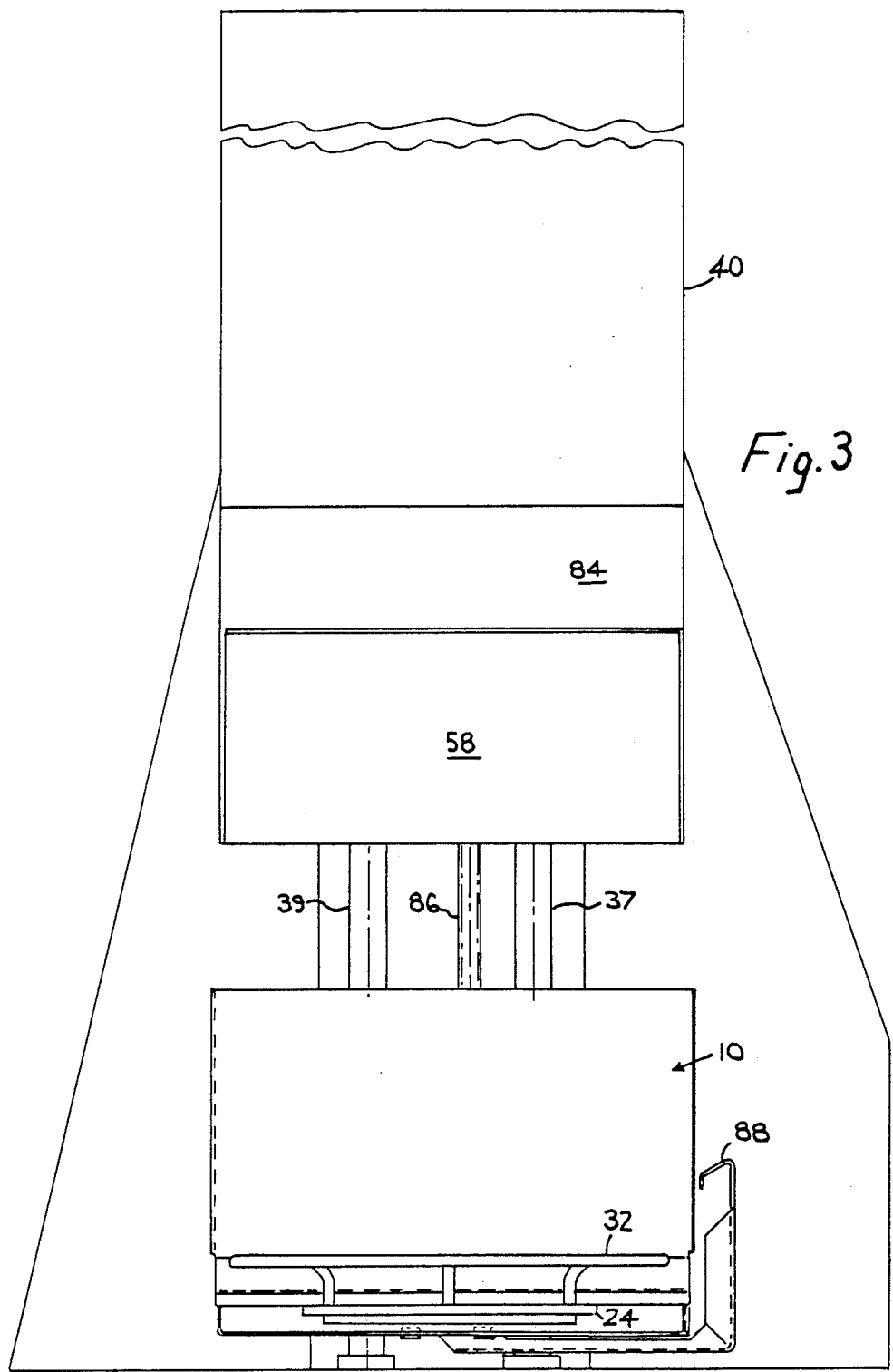
Figure 4:
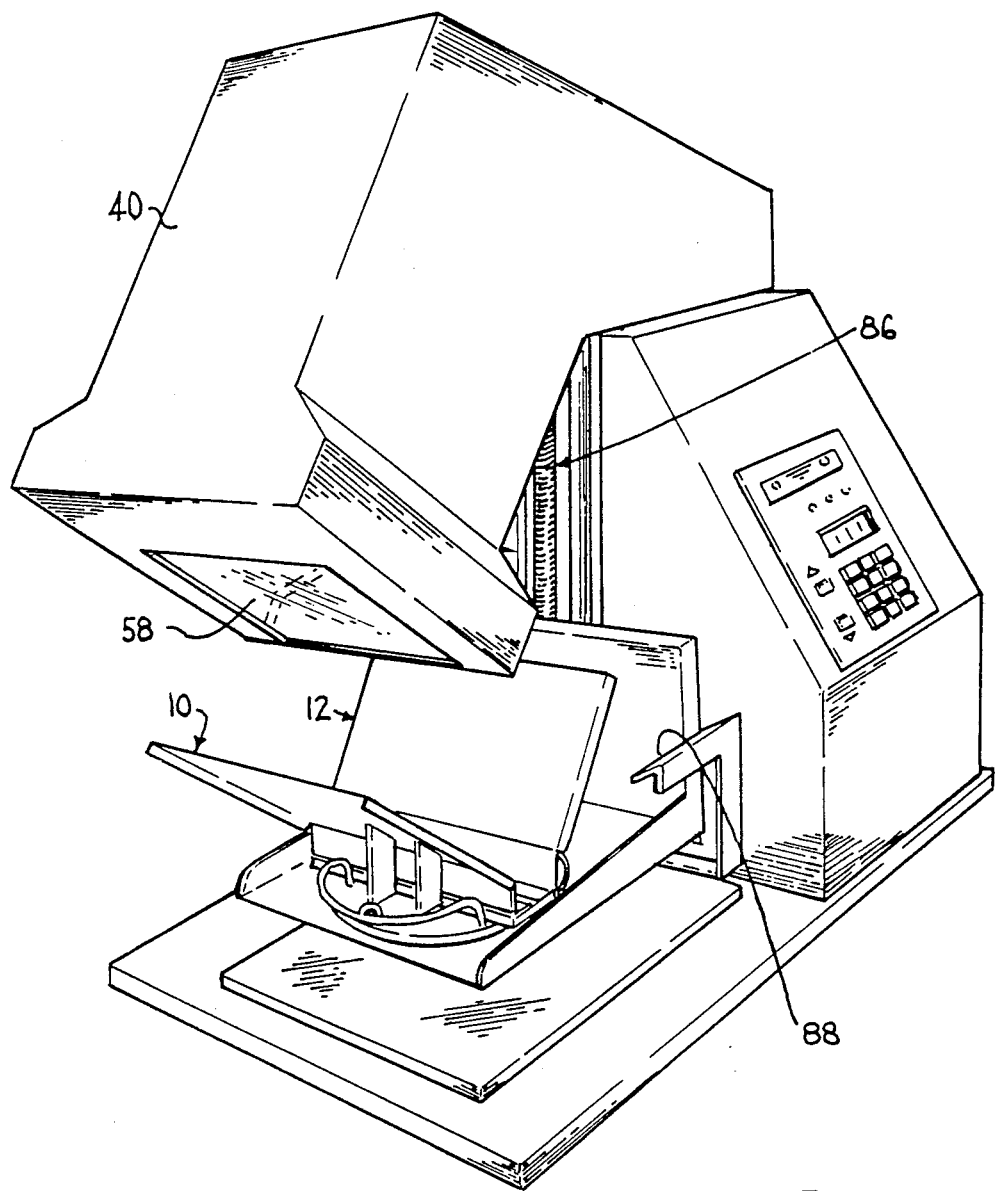

The invention will now be described by way of example with reference to the accompanying drawings in which:

FIG. 1 is a side elevation from the front of a book support and scanner constructed in accordance with the invention, FIG. 2 is a top plan view of part of the scanner housing of FIG. 1, FIG. 3 is an end elevation of the unit shown in FIG. 1, and FIG. 4 is a perspective view of this embodiment of the invention.

FIG. 1 illustrates in side elevation a complete scanner unit and book support. The latter comprises a pair of diverging plates generally designated 10 and 12 and each comprising a metal inner member 14 and 16 and an outer coating of plastics material 18 and 20 respectively.

The two metal struts 14 and 16 are joined in a channel arrangement at 22 which itself is attached to an uppper ring 24 of a bearing assembly having a lower ring 26 which is secured to a lifting base 27 (to be described in more detail hereinafter) mounted on a lower final base 28.

A ball-race 34 allows for rotation of the upper ring 24 relative to the lower ring 26 and a hand grip 32 extends around the upper ring to allow for manual rotation of the ring and support assembly.

A springloaded ball 30 and corresponding depressions such as 36 in the underside of the upper ring 24 provide stops to define at least two preferred angular positions separated by 180° of rotation of the ring 24. The base 28 serves as a support for a column 37 and associated housing 38 which houses controls and drives as required. At the upper end the column provides a support for a housing 40 within which is located a scanner unit 42 such as a Fairchild type CCD 1500. The latter is mounted rigidly on a platform 44 the underside of which slideably engages a guide rail 46 and includes a driving collar threadedly engaged on a screw threaded rod 48. Rotation of the collar produces lateral movement of the platform 44 parallel to the guide rail 46.

A further guide rail at 50 prevents any torsional movement of the platform.

A drive means (not shown) such as an electric motor is provided on the underside of the platform to drive the latter from one end of its traverse to the other.

The position of the platform 44 at the opposite end of its traverse is shown in dotted outline at 52.

Protruding from the platform is an arm 54 which is shown broken in order to reduce hidden detail to the minimum. The lower end of the arm 54 carries a strip light 56 and electrical connection to the strip light is achieved through a flexible cable (not shown).

As the platform 44 moves along its rails, the strip light 56 travels by the same lateral distance.

The strip light 56 is positioned just behind a window 58 in the lower end of the housing 40 and the scanner 42 is arranged to view a narrow strip which extends perpendicular to the direction of travel of the platform 44 and which with movement of the platform 44 from one end to the other of the rails 46 and 50, moves from the end 60 to the end 62 of the window 58 and in the reverse direction back again from 62 to 60.

The scanner comprises a linear array of photoconductive junctions (charge coupled devices) and an appropriate lens (all not shown) so that a document positioned just to the left of the window 58 will be brought to focus in a plane containing the line of photoconductive junctions.

An electrical scanning circuit scans the junctions in succession so as to produce a series of electrical pulses corresponding to the illumination levels along the narrow field of view seen by the scanner at any instant. By synchronizing the movement of the scanner 42 and the rate of movement along the rails 46 and 50 the outward signal will approximate a video signal similar to that obtained by rectilinear line scanning.

A book is shown in dotted outline at 64, opened and resting on the two inclined diverging supports 10 and 12. The upwardly facing surface of the left hand open page 66 will be viewed by the scanner 42 through the window 58 and a video signal of the page concerned can be obtained by scanning in the manner previously described.

By rotating the platform ring 24 through 180°, the opposite facing page 68 will be presented to the window 58 and can be scanned and converted into a video signal in a similar manner.

In order to present the appropriate page of the book to the window 58, the support assembly carried by the lifting platform 27 can be elevated until the pages of the book are in contact with the window 58 and the underside of the housing 70. To this end an electric motor drive shown in dotted outline at 72 is provided in the housing 38 and the lifting platform 27 is attached to a sleeve 74 carried by the column 37 which is driveable up and down the column by means of the electric motor 72 typically via the gearbox and clutch mechanism.

Up and down controls at 76 and 78 respectively are provided for appropriate rotation of the electric motor 72.

A stop mechanism is provided which detects when the book is just below the housing 40 with the book still out of contact with the window 58 and underside 70 of the housing 40. At this position the motor 72 is stopped automatically and a form of manual control is provided to allow the book to be offered up into contact with the housing 40 under hand control. Although not shown, a ratchet or clutch mechanism is provided which allows the assembly carried by the lifting platform 27 to be moved in an upward direction without fall-back occurring and a declutching device (again not shown) is provided to allow the platform to be moved in a downward direction after the page 64 has been scanned.

Although not shown, stop means is provided at the bottom of the travel to arrest the movement of the motor and downward movement of the sleeve 74 before bottoming.

In order to provide for a degree of shock absorbing, the ring 26 may be carried by rubber bushes at 77 and 79.

FIG. 2 is a cross-section through the housing 40 viewed from above and shows the window 58 in relation to the elongate fluorescent tube 56 previously shown in FIG. 1. In addition the field of view of the scanner 42 is demonstrated by the diverging lines 80 and 82. To this end the divergence is intended to accommodate the full width of the window 58 and the movement of the scanner 42 along guide rails 46 and 50 is intended to cover the perpendicular dimension of the window 58.

FIG. 3 which is an end elevation of the equipment shown in FIG. 1, illustrates the extent of the window 58 in the lower inclined face 84 of the housing 40.

The left hand side of the book support 10 can clearly be seen in FIG. 3 as also can the handwheel section 32 attached to the upper ring 24.

As is more clearly seen in FIG. 3, the column 37 is one of a pair the other being denoted by reference numeral 39 and drive to the lifting platform 27 is achieved through rotating screw 86 located between and parallel to the two columns 37 and 39.

By using two columns any tendency of the book support assembly to twist about the axis of the screw threaded drive 86 will be prevented.

FIG. 3 also shows the handle 88 (also shown in FIG. 1) which extends laterally from the sleeve 74 and can be used by the operator to raise and lower the support manually during the last part of the travel.

Although not shown a mechanical lock is provided between the rotatable upper ring 24 and the lower ring 26 which is released when the base 27 bottoms onto the lower base 28. In this way the trough 10, 12 can only be rotated when it is well clear of the lower vertex 60.

In FIG. 4 similar reference numerals have been employed to designate parts which are common to the earlier Figures.

A further refinement not previously mentioned has been incorporated namely a sliding movement between the trough 10, 12 and the platform 27 so as to allow a book gutter to be self centering relative to the vertex 60.

What is claimed is:

1. A document scanner for scanning a page of a book comprising:
    (1) a housing having a wedge section at least one face of which comprises a window which can be positioned against the page of the book, with the ridge of the wedge in the fold of the book;
    (2) lamp means within the housing for illuminating the page positioned against the window;
    (3) a scanner movable within the housing to scan an illuminated page which is visible through said window to generate an electrical video signal corresponding to the information carried by the page;
    (4) a V-shaped trough in which a book will rest and forming a book support movably attached to the housing, the angle of the trough corresponding to the included angle of the wedge shaped housing and aligned therewith so that a book resting in the trough can be sandwiched between the faces of the wedge and the sides of the trough; and
    (5) drive means for effecting relative movement between the housing and the trough to permit movement sufficiently apart to enable insertion or removal of the book from the trough and alternatively to effect movement of the housing and trough closely together to sandwich the book therebetween for scanning.

2. A document scanner as claimed in claim 1 in combination with signal storage means for storing electrical signals obtained from the scanning.

3. A document scanner as claimed in claim 1 wherein the trough is formed from two upwardly divergent plate means.

4. A document scanner as claimed in claim 3 wherein a channel is provided between the two lowermost edges of the two plate means so as to accommodate the spine of a book resting in the trough.

5. A document scanner as claimed in claim 3 wherein the two plate means are relatively movable so as to alter the included angle therebetween.

6. A document scanner as claimed in claim 3 wherein the lateral spacing between the two lowermost edges of the two plate means is adjustable.

7. A document scanner as claimed claim 3 wherein at least one of said plates is vertically movable.

8. A document scanner as claimed in claim 3 wherein the surface of each plate is at least in part formed from resiliently deformable material to accommodate any unevenness in the external surfaces of a book cover.

9. A document scanner as claimed in claim 1 wherein said drive means causes the trough to be lifted up and lowered down relative to said housing.

10. A document scanner as claimed in claim 1 wherein said drive means is in two parts, one part being a powered drive for raising the trough from its lowermost position up to a position at which it is just below the wedge shaped housing and for lowering the trough in a downward direction to its said lowermost position, and the other part being a secondary drive by which the trough can be moved upward so as to squeeze the book into contact with the wedge shaped housing.

11. A document scanner as claimed in claim 1 wherein the trough is movable sufficiently below the housing to be rotated about a vertical axis, so that a book located therein can be rotated to present one opened page or the other to the window in the housing.

12. A document scanner as claimed in claim 11 wherein an interlock is provided to inhibit rotation of the trough unless said trough is sufficiently below the wedge shaped housing.

13. A document scanner as claimed in claim 1 wherein the book support is mounted on a platform and is movable in a direction perpendicular to the lowermost edge of said housing to allow a book to center itself as it is offered up to the scanner housing.

* * * * *